(12) United States Patent
Xu et al.

(10) Patent No.: US 11,087,637 B2
(45) Date of Patent: Aug. 10, 2021

(54) FINGER READING METHOD AND DEVICE BASED ON VISUAL GESTURES

(71) Applicant: South China University of Technology, Guangdong (CN)

(72) Inventors: Wang Xu, Guangdong (CN); Xiangmin Xu, Guangdong (CN); Xiaofen Xing, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 824 days.

(21) Appl. No.: 15/117,948

(22) PCT Filed: Dec. 3, 2014

(86) PCT No.: PCT/CN2014/092851
§ 371 (c)(1),
(2) Date: Aug. 10, 2016

(87) PCT Pub. No.: WO2016/029581
PCT Pub. Date: Mar. 3, 2016

(65) Prior Publication Data
US 2016/0351068 A1  Dec. 1, 2016

(30) Foreign Application Priority Data
Aug. 27, 2014  (CN) .......................... 201410424962.X

(51) Int. Cl.
*G09B 17/00* (2006.01)
*G09B 5/06* (2006.01)
(Continued)

(52) U.S. Cl.
CPC ........... *G09B 17/006* (2013.01); *G06F 3/017* (2013.01); *G06F 3/167* (2013.01);
(Continued)

(58) Field of Classification Search
CPC .............................. G09B 17/006; G06F 3/017
(Continued)

(56) References Cited

U.S. PATENT DOCUMENTS

| 5,868,581 A * | 2/1999 | King | G09B 5/062 |
| | | | 200/5 A |
| 6,115,482 A * | 9/2000 | Sears | G06F 3/011 |
| | | | 348/62 |
| 6,199,042 B1 * | 3/2001 | Kurzweil | G09B 5/065 |
| | | | 434/309 |
| 9,911,361 B2 * | 3/2018 | Wexler | G06F 1/163 |

(Continued)

FOREIGN PATENT DOCUMENTS

| CN | 101729808 | 6/2010 |
| CN | 101730278 | 6/2010 |

(Continued)

*Primary Examiner* — Jerry-Daryl Fletcher
*Assistant Examiner* — Sadaruz Zaman
(74) *Attorney, Agent, or Firm* — Muncy, Geissler, Olds & Lowe, P.C.

(57) ABSTRACT

A finger reading method and device based on visual gestures. A user makes a circle on a required finger reading region on a book by using a finger; a camera captures the circle making action of the finger, and an image processing module acquires the position a fingertip according to a profile analysis algorithm, acquires the endpoints of the track edge in upper, lower, left and right directions, and fits a rectangle according to the upper, lower, left and right end points in order to identify content such as characters or graphs of rectangular region content. A voice synthesis technology is performed. Voice information is fed to the user to realize a finger reading functions. The device can be worn on the head of the user, and includes camera and bone conduction earphones arranged on both sides thereof.

7 Claims, 4 Drawing Sheets

(51) Int. Cl.
*G06F 3/01* (2006.01)
*G06F 3/16* (2006.01)
*G06K 9/00* (2006.01)
*G06K 9/20* (2006.01)
*G10L 15/22* (2006.01)
*G10L 13/00* (2006.01)
*G09B 19/06* (2006.01)
*G10L 13/04* (2013.01)

(52) U.S. Cl.
CPC ....... *G06K 9/00355* (2013.01); *G06K 9/2081* (2013.01); *G09B 5/062* (2013.01); *G09B 19/06* (2013.01); *G10L 13/04* (2013.01); *G06T 2207/10024* (2013.01); *G06T 2207/20104* (2013.01); *G06T 2207/20112* (2013.01); *G06T 2207/30196* (2013.01); *G10L 13/00* (2013.01); *G10L 15/22* (2013.01)

(58) Field of Classification Search
USPC .......................................................... 434/169
See application file for complete search history.

(56) References Cited

U.S. PATENT DOCUMENTS

| | | | | |
|---|---|---|---|---|
| 2004/0076935 | A1* | 4/2004 | Kelley | G09B 5/02 |
| | | | | 434/169 |
| 2010/0331043 | A1* | 12/2010 | Chapman | G01C 21/20 |
| | | | | 455/556.1 |
| 2013/0295535 | A1* | 11/2013 | Levy | G09B 17/003 |
| | | | | 434/169 |
| 2014/0253701 | A1* | 9/2014 | Wexler | A61F 9/08 |
| | | | | 348/62 |
| 2015/0356881 | A1* | 12/2015 | Butler | G09B 17/006 |
| | | | | 434/169 |
| 2016/0035241 | A1* | 2/2016 | Butler | G09B 19/06 |
| | | | | 434/113 |

FOREIGN PATENT DOCUMENTS

| | | |
|---|---|---|
| CN | 101930282 | 12/2010 |
| CN | 102136201 | 7/2011 |
| CN | 104157171 | 11/2014 |
| TW | 201020867 | 6/2010 |

* cited by examiner

FINGER READING METHOD AND DEVICE BASED ON VISUAL GESTURES

TECHNICAL FIELD

The present invention relates to a head wearing electronic learning device, and more particularly relates to a finger reading method and device based on visual gestures, which is used for the ordinary printed material to identify and play specific region content such as characters or graphs.

BACKGROUND

Finger reading machine is a new learning aid tool, and plays an important role in aiding people to learn languages.

One kind has a housing similar to a notebook, in which conductive mesh films intersecting a crisscross, and a finger reading pen sensing or transmitting wireless signals. In use, a book is tiled on the housing, and is set with corresponding page codes. When the finger reading pen touches locations of the book with characters thereon, wireless signals transmitted by the finger reading pen is received by the conductive mesh plate in the housing, longitude and latitude locations corresponding to the book content are determined, and corresponding voice data are read based on preserved in the finger reading machine, to realize "finger reading" function.

Another kind does not need the housing said above, but directly uses two dimensional codes printed on the book. In use, only a finger reading pen based on Optical Identification (OID) is needed to "scan" required finger reading content. A high speed camera mounted on a pen nib identifies two dimensional codes on the book so as to read voice files of corresponding content, which realizes "finger reading" function.

The two kinds of finger reading solutions both have deficiencies.

The first is that specific book is necessary, for example input information in advance or specifically printed books, which increases manufacturing cost and restrains learners' learning scope.

The second is that finger reading content is fixed, and can not be expanded by internet. If a learner wants to deeply know about some content, he can not be aided immediately, which decreases learning efficiency.

The third is that the learner has to hold the finger reading pen by hand during the course of use, and needs to switch to hold the pen when needs to make notes on the book, which is troublesome.

With the development of the technology, people use the intelligent devices more and more frequently, and rely more on them. More and more wearable devices have an important function that avoids restraint of handheld electronic devices to pursue more intelligent and more convenient experience.

In general, finger reading method combined with wearable device may be important development direction of future finger reading devices.

SUMMARY OF THE INVENTION

The main purpose of the present invention is to provide a finger reading method and device based on visual gesture, the device is wearable device, that allows the user to avoid restraint of handheld electronic device when the user is learning, and have intelligent finger reading learning instruction facing ordinary printed material. In order to achieve the above purpose, the present invention provides a technical solution as below.

A finger reading method based on visual gesture, comprises following steps:
1) using a camera to capture circle making action of a finger, the circle making action referring to that a user makes a circle on a required finger reading region by using a finger;
2) an image processing module forming a rectangle region according to finger track;
3) the image processing module identifying characters or graphs of the rectangular region;
4) a voice processing module performing voice synthesis according to identified result or according to internet searching result based on the identified result, and playing by a playing device.

Furthermore, the step 4) further comprises the user searches designated vocabularies or content over the network through voice command.

Furthermore, the voice processing module further identifies the user's fixing clauses for issuing command.

Furthermore, in step 2), the image processing module firstly analyzes camera image by skin color segmentation algorithm, and detects if a human hand appears in the camera, if not, continuing to analyze camera image by skin color segmentation algorithm, if yes, the camera captures the circle making action of the finger, and the image processing module acquires fingertip position by profile analysis algorithm, and acquires edge end points in upper, lower, left and right directions on a track, then fits the rectangle region according to the end points on the track.

A device implementing the finger reading method based on the visual gesture, comprises a main housing, a camera, a bone voice conduction module, and the main housing having an image processing module, a voice processing module, a wifi network module and an embedded microprocessor module therein; the camera being mounted on the main housing or being embedded in the main housing, the bone voice conduction module being located on both sides of the main housing for attaching on cheekbones above user's ears; scope of the camera covering required finger reading scope before the user for acquiring the circle making action of the finger and content image to be identified; The image processing module acquires user finger moving track in image identifying camera scope by the camera and fits the user finger moving track to the rectangle, and intelligently identifying content in the fitted rectangle region.

The voice processing module performs voice synthesis according to identified result of the image processing module or network searching result, and identifies the user's fixed voice command;

The bone voice conduction module provides learning instruction and voice prompt by bone conduction according to output result of the voice processing module;

The wifi network module is used in such a way that after accessing LAN or internet, the voice processing module web searches designated vocabularies or content by identifying user voice command; the voice processing module transmits designated content to LAN or internet database server after voice instruction recognition for expanding content searching.

The embedded processor module builds an embedded processor therein for controlling communication and working order of the modules.

Furthermore, the bone voice conduction module is implemented by bone conduction earphones.

Furthermore, the main housing has shape of head band for being worn on forehead and back side of head, and the camera is arranged in middle of the head band. The main housing has head band fashion for being worn on forehead and back side of head, and material is environment-friendly compound resin.

The camera is a 150 degree wide-angle lens and covers a user's front desk when the user is learning with normal gesture.

Comparing with prior art, the invention has following advantages and technical effects:

1) Specific book is not necessary. The invention is a head wearing finger reading device used for the ordinary printed object to identify and play voice data corresponding to specific region content such as characters or graphs, which decreases textbook cost and expands learner's learning scope;
2) Finger reading content is adjustable. By visual gesture technology and Internet technology, the content required to be identified is searched through network and is fed back;
3) The device is only worn on a head, making the user avoid restraint of handheld electronic device and increase learning efficiency.

DETAILED DESCRIPTION OF THE INVENTION

The present invention will be further described combined with appending drawings and detailed embodiments.

Figure 1:
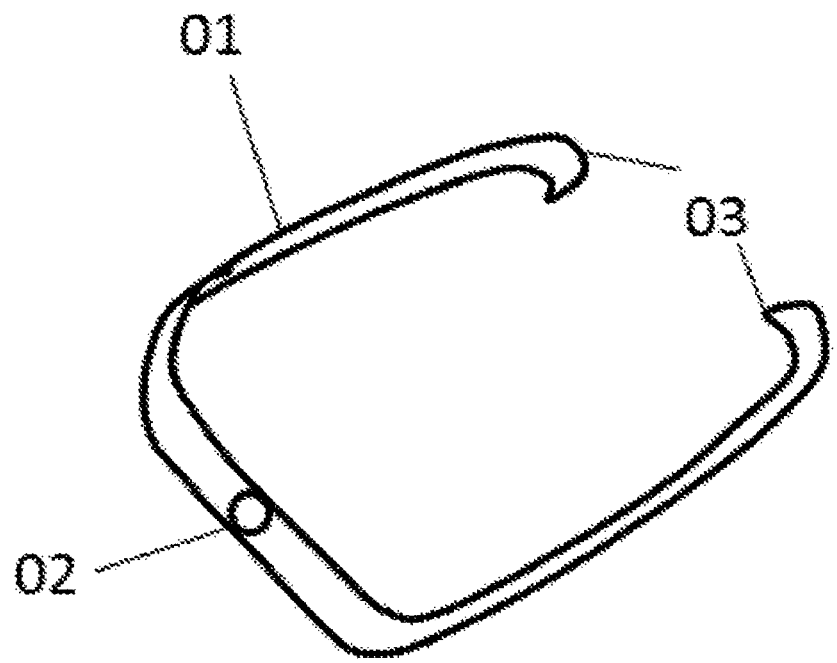
FIG. 1 is a schematically outside structural view of a finger reading device based on visual gesture according to an embodiment of the present invention.

As shown in FIG. 1, a head wearing device has a shape of head band, and includes a main housing, i.e. head band housing 01, a wide-angle camera 02, two bone conduction earphones 03. The head band housing 01 has material of environment friendly compound resin, healthy and contaminant, and may be attached to skin. The wide-angle cameral is specifically a 150 degree wide-angle camera, and covers a book on a desk when wearing the head band. The bone conduction earphones 03 are worn on both sides of the head band. When wearing the head band, the bone conduction earphones are exactly attached to cheekbones above the ears.

Figure 2:
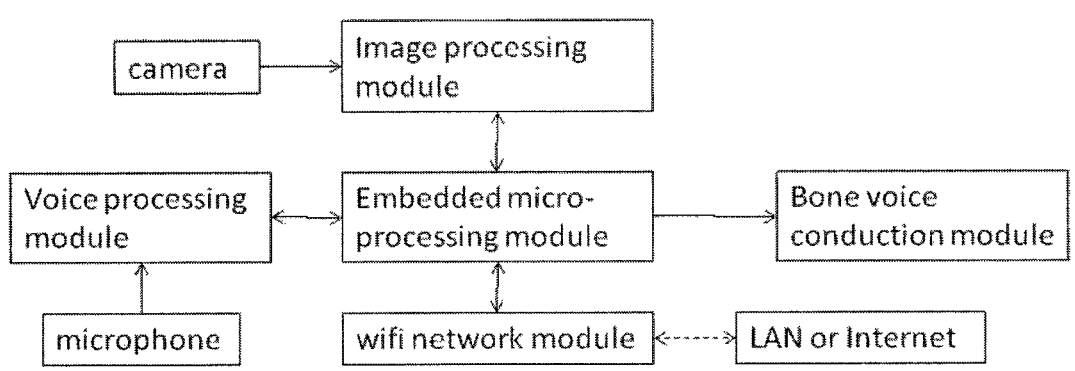
FIG. 2 is a schematically structural view of modules of the finger reading device based on visual gesture according to the embodiment of the present invention.

The finger reading device based on visual gesture, as shown in FIG. 2, includes main modules as follows:

1) Embedded microprocessor module, the module builds embedded micro processor therein for generally controlling communication and working order of all modules of the device.
2) Image processing module, the module identifies a user's finger moving track in scope of the camera and fits the user finger moving track to a rectangle, and intelligently identifies content in the fitted rectangle region.
3) Voice processing module, the module performs TTS voice synthesis based on the intelligently identifying result or network searching result, and identifies the user's fixed voice command to the device.
4) Wifi network module, the module is used in such a way that after accessing LAN or internet, the user web searches designated vocabularies or content by voice command. The voice processing module transmits designated content to LAN or internet database server after voice instruction recognition for expanding content searching.
5) Bone voice conduction module, the module provides learning instruction and voice prompt by bone conduction according to result of the voice processing module.

Figure 3:
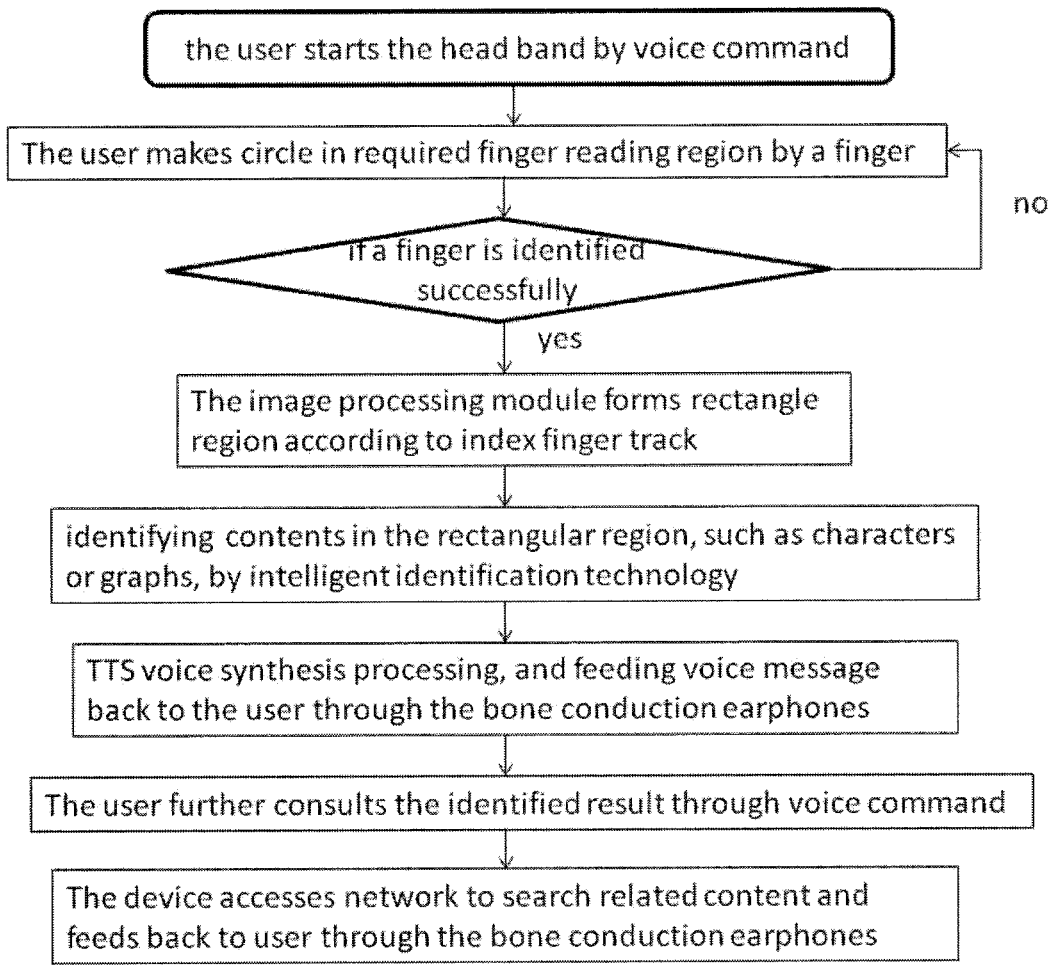
FIG. 3 is a flow chart of a finger reading method based on visual gesture according to the embodiment of the present invention.
Figure 4:
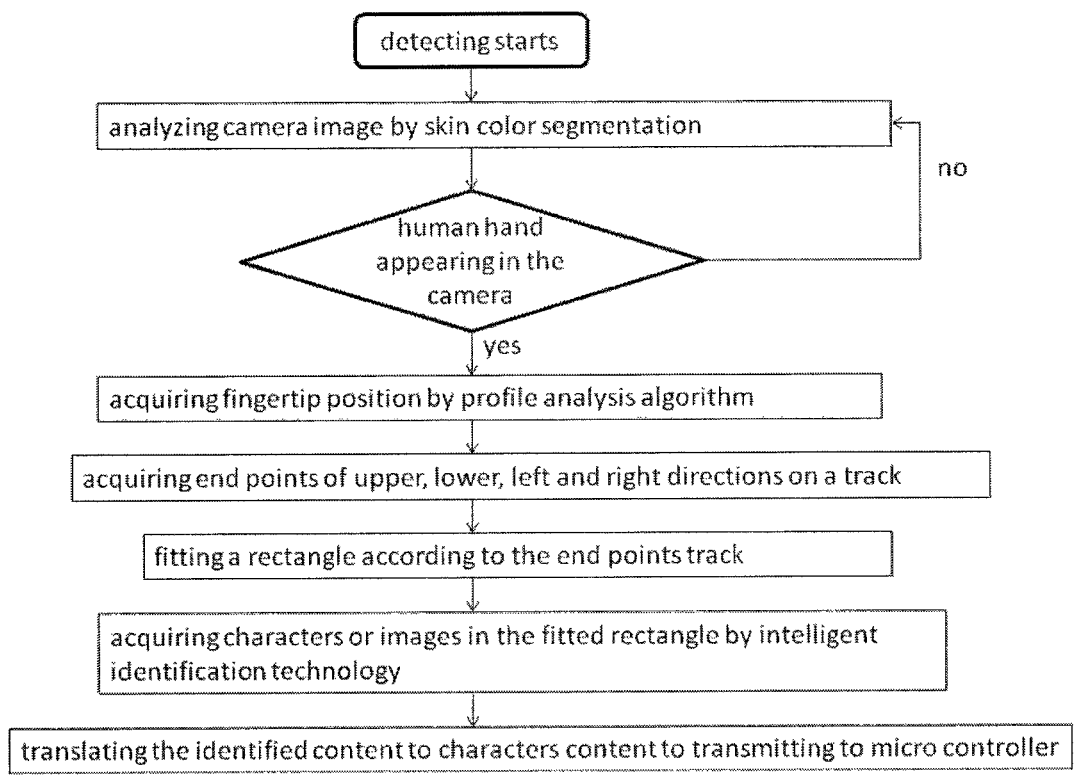
FIG. 4 is an image processing flow chart of the finger reading method based on visual gesture according to the embodiment of the present invention.
Figure 5A:
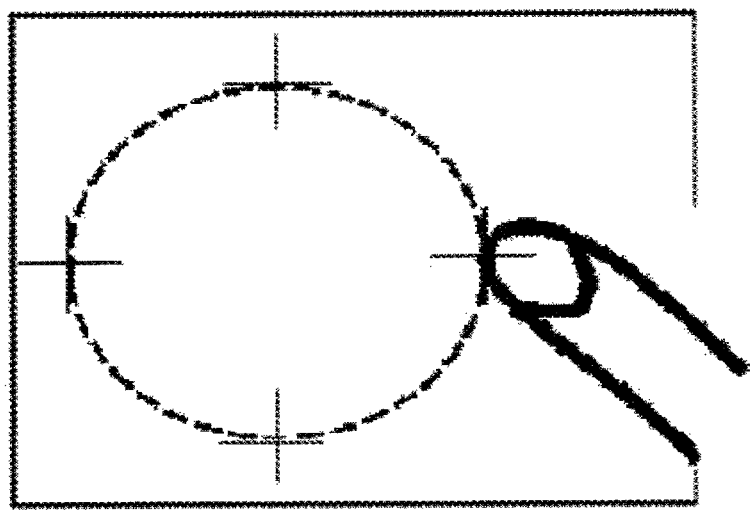
FIGS. 5a and 5b are schematic process view of identifying content scope based on finger track in the finger reading method based on visual gesture according to the embodiment of the present invention.
Figure 5B:
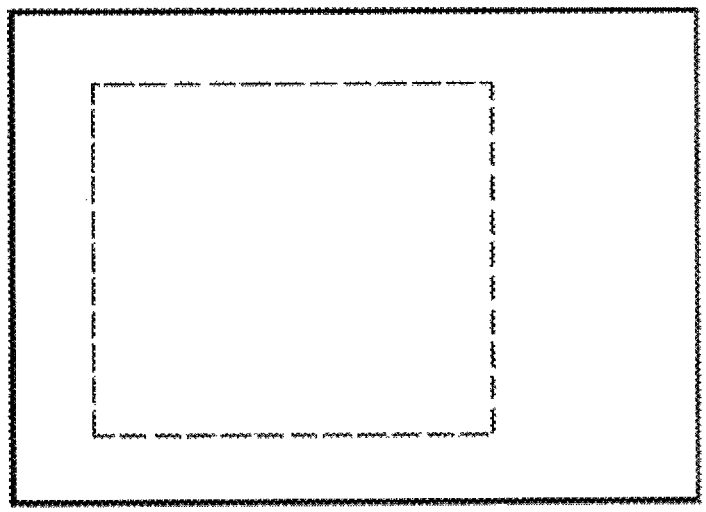

The finger reading method based on visual gesture, as shown in FIG. 3, includes steps as following:

1) The user starts the head band by voice command. The voice command is system predetermined command, for example "Start Please".
2) The user makes circle in finger reading region by a finger. In this step, the finger of the user is normally a finger and other four fingers are redundant, and the user makes circle evenly in the required finger reading region, the speed of making circle is suggested to be not so quick.
3) The camera captures circle making action of the finger. If the user operates irregularly, for example, speed of making circle is so quick that the camera can not identify the finger correctly, the system may provide voice prompt for the user through the bone conduction earphones, for example "Error, Please restart".
4) The image processing module forms rectangle region according to finger track. The step is illustrated in detail, as shown in FIGS. 4 and 5.
   When detecting starts, the image processing module firstly analyzes camera image by skin color segmentation algorithm, detecting whether human hand appears in the camera. If not, the camera image is analyzed by skin segmentation algorithm. If yes, the camera captures circle making action of the finger, the image processing module acquires fingertip position by profile analysis algorithm, and acquires edge end points of upper, lower, left and right directions on a track, as shown in FIG. 5a. Then, fitting a rectangle is performed according to the end points track, as shown in FIG. 5b.
5) Camera captures characters or images information in the rectangle region, the image processing module identifies information collected by the camera through intelligent recognition technology (for example OCR characters recognition technology, image recognition technology based on neural network etc.), and translates the identified content to characters to transmit to micro controller.
6) Voice processing module performs voice synthesis by TTS technology, and feeds the voice information back to the user through bone conduction earphones.
7) The user further consults the identified result by voice command. The voice command of this step includes some fixed commands which are predetermined, for example, "I want to learn more about it".

8) Device accesses network to search related content and feeds back through bone conduction earphones. The system searches related content by will network module accessing network, and filters unwanted content, finally feeds back required content to the user by bone conduction technology.

As can be seen, the device of the present invention is a wearable device which can be worn on the user's head. The camera on the device identifies the user's finger track to fit to a rectangle when the user needs finger reading, and content in the rectangle region is intelligently identified, the identified characters contents processed by TTS voice synthesis and is fed back to the user by bone conduction technology. Moreover, when the user wants to know more about identified content related information, voice command may start the device to access to network to search related content, and the content may be fed back to the user by bone conduction technology. The device combines advanced wearable principle, avoids restraint of handheld electronic device when the user is learning, and obtains intelligent finger reading learning instruction facing ordinary printed material.

What is claimed:

1. A finger reading method based on visual gesture, comprising following steps:
   1) capturing, by a camera, a circle making action of a finger, the circle making action referring to that a user makes a circle on a required finger reading region on a book by using a finger;
   2) determining, by an image processing module, a rectangular region according to the captured circle making action;
   3) identifying, by the image processing module, characters or graphs of the determined rectangular region;
   4) performing voice synthesis, by a voice processing module, according to identified result from identifying the character or graphs of the rectangular region or according to internet searching result based on the identified result, generating synthesized voice data based on the voice synthesis, and playing the synthesized voice data by a playing device,
   wherein in step 2), the image processing module acquires a fingertip position by profile analysis algorithm, and acquires edge end points in upper, lower, left and right directions on the captured circle making action of the finger, then fits the rectangle region according to the edge end points.

2. The finger reading method based on visual gesture according to claim 1, wherein the step 4) further comprises the user web searches designated vocabularies or content by voice command.

3. The finger reading method based on visual gesture according to claim 1, wherein the voice processing module further identifies fixing clauses of the user for issuing command.

4. The finger reading method based on visual gesture according to claim 1, wherein in step 2), the image processing module firstly analyzes a camera image by a skin color segmentation algorithm, and detects whether a human hand appears in the camera, if not, continuing to analyze camera image by skin color segmentation algorithm, if yes, the camera captures the circle making action of the finger.

5. A device for detecting visual gesture, comprising a main housing, a camera, a bone voice conduction module, and the main housing having an image processing module, a voice processing module, a wifi network module and an embedded microprocessor module therein; the camera being mounted on the main housing or being embedded in the main housing, the bone voice conduction module being located on both sides of the main housing for attaching on cheekbones above a user's ears; a scope of the camera covering a required reading field for capturing an image for acquiring a circle making action of user finger and content image to be identified;

the image processing module acquiring the user finger moving track in image identifying camera scope by the camera, acquiring edge end points in upper, lower, left and right directions on the user finger moving track, fitting the user finger moving track inside a rectangle according to the edge end points, and intelligently identifying content in the fitted rectangle region;

the voice processing module performing voice synthesis according to identified result of the image processing module or network searching result, and identifying fixed clauses of the user for issuing command;

the bone voice conduction module providing learning instruction and voice prompt by bone conduction according to output result of the voice processing module;

the wifi network module being used in such a way that after accessing LAN or internet, the voice processing module web searching designated vocabularies or content by identifying user voice command; the voice processing module transmitting designated content to LAN or internet database server after voice instruction recognition for expanding content searching;

the embedded microprocessor module building an embedded processor therein for controlling communication and working order of the modules.

6. The device according to claim 5, wherein the bone voice conduction module is implemented by bone conduction earphones.

7. The device according to claim 5, wherein the main housing has shape of head band for being worn on forehead and back side of head, and the camera is arranged in middle of the head band.

* * * * *